UNITED STATES PATENT OFFICE 2,328,159

PREPARATION OF HALOGEN SUBSTITUTED AMINOARYLSULPHONIC ACID DERIVATIVES

Henry Martin, Basel, Hans Heinrich Zaeslin, Riehen, near Basel, and Rudolf Hirt and Alfred Staub, Basel, Switzerland, assignors to J. R. Geigy A. G., Basel, Switzerland No Drawing. Application December 14, 1939, Serial No. 309,292. In Switzerland December 24, 1938

10 Claims. (Cl. 260—401)

It has been found that new, technically valuable, water soluble compounds are obtained by treatment of monoaminosulphonic acids of the general formula

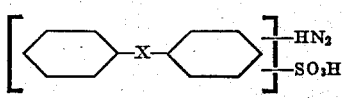

in which X represents a divalent atom, such as O or S, or a divalent atomic group, such as SO, SO₂, CH₂, CO, NH, NH—CO—NH, with aromatic, araliphatic or high molecular aliphatic monoacylating agents or with any polyacylating agent, all the reaction components being so chosen that at least one is halogenated. The halogen can, however, be partly or wholly introduced into the unhalogenated or low halogenated end product. The position of the halogen atom is immaterial.

In general the following aminosulphonic acids are well adapted for this process: the sulphonic acids of aminodiphenylethers, of aminodiphenylsulphides, of aminodiphenylsulphoxides, of aminodiphenylsulphones, of aminodiphenylmethanes, of aminodiphenylketones, of aminodiphenylamines, of aminodiphenylureas, etc. Particularly advantageous is the use of halogen and alkyl substituted derivatives of the above mentioned amino sulphonic acids, such as for example 4,4'-dichloro-2-amino-1,1'-diphenylether-2'-sulphonic acid, 4-chloro-4'-amino-1,1'-diphenylether-2'-sulphonic acid, 2'-4-dichloro-4'-amino-1,1'-diphenylether-2-sulphonic acid, 3-methyl-4-chloro-4'-amino-1,1'-diphenylether-2'-sulphonic acid, 3,4-dichloro-4'-amino-1,1'-diphenylsulphide-2'-sulphonic acid, 3,4-dichloro-2'-amino-1,1'-diphenylsulphide-4'-sulphonic acid, 4-chloro-4'-amino-1,1'-diphenylsulphoxide-2'-sulphonic acid, 4-chloro-4'-amino-1,1'- diphenylsulphone - 2' - sulphonic acid, 4,4'-dichloro-2-amino-1,1'-diphenylmethane-2'-sulphonic acid, 4-chloro-4'-aminodiphenylketone-3-sulphonic acid, 3,4-dichloro-4'-aminodiphenylamine - 2' - sulphonic acid etc. Where the unhalogenated aminosulphonic acid is employed, the condensation product is halogenated by the usual process. This can also be employed with products having only a low halogen content.

Where halogen substituted aminosulphonic acids are to be used, only selected technically obtainable halogenated compounds are available, as listed above, which, as a consequence of their preparation in a pure form, i. e. separation from the isomeric or bye-products formed simultaneously during halogenation, are relatively costly. The number of possible components is also decreased by the laws of substitution of the halogen atoms.

The halogenated aminodiphenylether sulphonic acids have proved themselves, among other monoaminosulphonic acids as particularly suitable. They are, for example, obtained by condensation of o- or p-chloronitrobenzene sulphonic acids with halogenophenols and subsequent reduction. The preparation of the halogenated amino-diphenylether sulphonic acids frequently offers certain difficulties, owing to the fact that the manufacture of the intermediate halogenophenols, particularly in the case of the higher substituted halogenophenols, in a pure form is not easy. Thus while pure p-chlorophenol and therefrom the condensation product with halogenonitrobenzenesulphonic acids in a pure form may easily be obtained, on the other hand it is particularly difficult to manufacture a sufficiently pure 2,4-dichlorophenol, as p-chlorophenol and 2,6-dichlorophenol are invariably present in the technical product owing to the difficulties of separation, as their boiling points are very similar.

As these products condense similarly and even easier than the 2,4-dichlorophenol, with halogenonitrobenzene sulphonic acids, so after reduction, is mostly a mixture of halogenated diphenylethers obtained which is not so suitable for a smooth condensation with the mentioned acylating agents. Although such mixtures may be suitable for certain technical purposes, for others it is necessary to prefer the homogeneous product. This can be done in part by the halogenation of the already prepared, unhalogenated or only low halogenated amino-arylsulphonic acids prepared according to this invention.

By such halogenation in the usual manners there are, in part, obtained the same aminoarylsulphonic acids as by the use of halogenated components, and, in part, aminoarylsulphonic acids halogenated in other positions, so that by the introduction of different halogens, new, until now technically unobtainable compounds are formed.

For the acylation of the above mentioned amino-sulphonic acids containing free amino groups, the aliphatic monocarboxylic acids with at least 7 carbon atoms, or any aliphatic polycarboxylic acid or araliphatic or aromatic mono- or poly-carboxylic acid can be used. Similarly come into consideration suitable aromatic and araliphatic sulphonic acids. Preferably here also the halogenated derivatives of these compounds are to be used. Obviously it is to be understood that all functional derivatives of the previously mentioned acids such as the esters, halogenides, etc., where their use in acylation is known, are also included. As examples are mentioned from the aliphatic carboxylic acids: capric acid, lauric acid, myristic acid, palmitic acid, stearic acid, etc., and also the naturally occurring cheap, fatty acid mixtures such as fish-oil acid, palm-kernel fatty acid, their derivatives such as α-halogenopalmkernel fatty acid halogenides, etc. From the araliphatic acylating agents are mentioned: phenylacetic acid, 2- or 4-halogenophenylacetic caid, hydrocinnamic acid, phenoxyacetic acid, halogen-substituted phenoxyacetic acids, etc. From the aromatic acylating agents: benzoic acid, 2,4- or 3-4-dichlorobenzoic acid, 3,4-dichlorobenzenesulphonic chloride.

The same or similar products can also be prepared from an aromatic monoamine of the formula

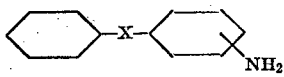

where X has the same definition as before, by treatment with the above mentioned acylating agents, followed by sulphonation to produce the solubility in water.

Through the particular choice of the acylating agents or by particular substitution in the aromatic aminosulphonic acids the possibility is given of obtaining products for different technical purposes. So can products be obtained which are especially good for the protection of wool, feathers, furs, hair, paper, textiles, leather, natural and artificial fibres, or materials containing these substances, against moths and other textile damaging insects. The fastness to washing, milling and light of such products is noteworthy. By other substitution, can be prepared products for use as disinfectants, bactericides, fungicides and insecticides, and also particularly good mercury free seed disinfectants. These compounds possess also good penetrative power, which in conjunction with the low poison effect on humans, makes them especially valuable for technical utilization.

The following examples illustrate the invention, the parts being by weight where nothing other is said.

Example 1

16 parts of 4-amino-4'-chloro-5'-methyl-1,1'-diphenylether-2-sulphonic acid are suspended in 150 parts by volume of dry pyridine, 15 parts of palm-kernel fatty acid chloride (mol. weight 220) are dropped in at 20° C. and stirred at 20–35° C. until a test shows no unchanged amino acid. Then the reaction is made phenolphthalein alkaline with sodium carbonate, the pyridine is distilled off with steam and the remaining solution is acidified with hydrochloric acid after cooling. The separated mass is washed with petroleum ether for removing the excess palm-kernel fatty acid, whereby the 4-lauroylamino-4'-chloro-5'-methyl-1,1'-diphenylether-2-sulphonic acid is obtained as an oil.

The same has in salt form the following formula:

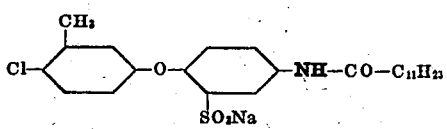

Instead of the 4-amino-4'-chloro-5'-methyl-1,1'-diphenylether-2-sulphonic acid also the 4-amino-4'-amyl-6'-chloro-1,1'-diphenylether-2-sulphonic acid, 4-amino-2',4',5'-trichloro-1,1'-diphenylether-2-sulphonic acid, 2-amino-2',4',5'-trichloro-1,1'-diphenylether-4-sulphonic acid, 2-amino-4',5-dichloro-1,1'-diphenylether-4-sulphonic acid, 2-amino-4',5-dichloro-5'-methyl-1,1'-diphenylether-4-sulphonic acid, 4-amino-2'-chloro-1,1'-diphenylether-2-sulphonic acid, 4-amino-4,6'-dichloro-1,1'-diphenylether-2-sulphonic acid, 2-amino-4',6'-dichloro-1,1'-diphenylether-4-sulphonic acid, 4-amino-4'-chloro-1,1'-diphenylether-2-sulphonic acid, 2-amino-4'-chloro-1,1'-diphenylether-4-sulphonic acid, 2-amino-4'-chloro-5'-methyl-1,1'-diphenylether-4-sulphonic acid, 4-amino-4',5'-dichloro-1,1'-diphenylether-2-sulphonic acid, 4-amino-4'-chloro-3',5'-dimethyl-1,1'-diphenylether-2-sulphonic acid, 2-amino-4'-chloro-3',5'-dimethyl-1,1'-diphenylether-4-sulphonic acid, 4-amino-4'-chloro-3'-methyl-6'-isopropyl-1,1'-diphenylether-2-sulphonic acid, 2-amino-4'-chloro-3'-methyl-6'-isopropyl-1,1'-diphenylether-4-sulphonic acid, 2-amino-3',6'-dichloro-1,1'-diphenylether-4-sulphonic acid, 4-amino-3',6'-dichloro-1,1'-diphenylether-2-sulphonic acid, or the 2-amino-4'-amyl-6'-chloro-1,1'-diphenylether-4-sulphonic acid may be used. These diphenylether sulphonic acids are obtained according to known processes by condensing o- or p-chloronitrobenzene sulphonic acids with the corresponding phenols and subsequent reduction.

Example 2

17.8 parts of sodium-2-amino-4,4'-dichloro-1,1'-diphenylether-2'-sulphonate, obtained by smooth sulphonation of 2-amino-4,4'-dichloro-1,1'-diphenylether and neutralization, are dissolved in 150 parts of water and the solution is cooled down to 10° C. Then 11.5 parts of 4-chlorophenylacetic acid chloride are dropped in and stirred without cooling until a test is no longer diazotizable. There is now neutralized with sodium carbonate and the condensation product precipitated with a solution of sodium chloride, in the form of a resin. After drying it is a light colored brittle mass, which is easily pulverizable and soluble in water to a clear solution.

Instead of the 4-chlorophenylacetic acid chloride also 2-chlorocinnamic acid halides may be used.

Instead of the above named sulphonic acid, also other diphenylethersulphonic acids may be used, especially those obtainable by sulphonation of unsulphonated diphenylethers, for example 4-amino-4'-chloro-1,1'-diphenylether-2'-sulphonic acid, 4-amino-4'-chloro-5'-methyl-1,1'-diphenylether-2'-sulphonic acid, 4-amino-2,4'-dichloro-1,1'-diphenylether-2'-sulphonic acid, 2-amino-4,4'-dichloro-5'-methyl-1,1'-diphenylether-2'-sulphonic acid, 4-amino-2,4'-dichloro-5'-methyl-1,1'-diphenylether-2'-sulphonic acid, 2-amino-4,4',5'-trichloro-1,1'-diphenylether-2'-sulphonic acid, 4-amino-2,4',5'-trichloro-1,1'-diphenylether-2'-sulphonic acid, 2-amino-4,2'- dichloro-1,1'-diphenylether-4'-sulphonic acid, 4-amino-4',6'-dichloro-1,1'-diphenylether-2'-sulphonic acid, 2-amino-4,4',6'-trichloro-1,1'-diphenylether-2'-sulphonic acid, 2-amino-4',6'-dichloro-1,1'-diphenylether-2'-sulphonic acid, 2-amino-4,4',5-trichloro-5'-methyl-1,1'-diphenylether-2'-sulphonic acid, 2-amino-4,4',5-trichloro-1,1'-diphenylether-2'-sulphonic acid, 2-amino-4-chloro-4'-amyl-1,1'-diphenylether-2'-sulphonic acid or 4-amino-2-chloro-4'-amyl-1,1'-diphenylether-2'-sulphonic acid.

*Example 3*

25 parts of 4-amino-4',5'-dichloro-1,1'-diphenylsulphide-2-sulphonic acid of 70% strength, obtained by condensation of 3,4-dichlorothiophenol with p-chloronitrobenzenesulphonic acid and subsequent reduction are suspended in 200 parts of dry pyridine, 15 parts of palm-kernel fatty acid chloride (or equimolecular parts of decyl-, dodecyl- or myristic acid chloride) are added dry by drop at 20–35° C. and stirred until a test shows no free amino acid. Then the reaction mass is made phenolphthalein alkaline with sodium carbonate, the pyridine is distilled off with steam and the remaining solution is acidified with hydrochloric acid after cooling. The precipitated 4-lauroylamino-4',5'-dichloro-1,1'-diphenylsulphide-2-sulphonic acid is washed with petroleum ether, whereby the excess of palm-kernel fatty acid which may be present, is completely removed.

Instead of 4-amino-4',5'-dichloro-1,1'-diphenylsulphide-2-sulphonic acid there may be used 4-amino-4'-chloro-1,1'-diphenylsulphide-2-sulphonic acid, 2-amino-4',5'-dichloro-1,1'-diphenylsulphide-4-sulphonic acid, 2-amino-4'-chloro-1,1'-diphenylsulphide-4-sulphonic acid, 4-amino-3',6'-dichloro-1,1'-diphenylsulphide-2-sulphonic acid, 2-amino-3',6'-dichloro-1,1'-diphenylsulphide-4-sulphonic acid, 4-amino-4'-bromo-1,1'-diphenylsulphide-2-sulphonic acid, 2-amino-4'-bromo-1,1'-diphenylsulphide-4-sulphonic acid, 4-amino-5'-chloro-6'-methyl-1,1'-diphenylsulphide-2-sulphonic acid, 4-amino-3'-chloro-6'-methoxy-1,1'-diphenylsulphide-2-sulphonic acid, 4-amino-3',4',6'-trichloro-1,1'-diphenylsulphide-2-sulphonic acid, 2-amino-3',4',6'-trichloro-1,1'-diphenylsulphide-4-sulphonic acid, 4-amino-2',4'-dichloro-1,1'-diphenylsulphide-2-sulphonic acid or 2-amino-2',4'-dichloro-1,1'-diphenylsulphide-4-sulphonic acid. These compounds can also be made by the above mentioned method.

*Example 4*

35.6 parts of 2-amino-4,4'-dichloro-1,1'-diphenyl-ether-2'-sulphonic acid (made according to Example 2) are dissolved in 150 parts by volume of anhydrous pyridine and 7.75 parts of succinic acid dichloride are added in small portions under vigorous stirring at 5–10° C. This temperature is kept during one hour, then a further hour at 20–25° C. and after that the pyridine is distilled off with steam. Then sodium chloride is slowly added to the remaining solution, whereby the condensation product precipitates well crystalline. It is filtered off, washed with a small quantity of sodium chloride solution and dried.

Instead of the succinic acid dichloride other dihalogenides of dicarboxylic acids may be used, for example of the adipic acid, of the terephthalic acid, homophthalic acid etc.

*Example 5*

46.2 parts of sodium-4-amino-2,4'-dichloro-5'-methyl-1,1'-diphenylether-2'-sulphonate, obtained by condensation of Raschit with 3,4-dichloronitrobenzene, reduction and following sulphonation, are dissolved in 200 parts of water and 18 parts of calcinated soda added to this solution. Thereto are added drop by drop under vigorous stirring at 10–15° C., 30 parts of chloroacetyl chloride and the whole is stirred for a further hour. Thereafter a test proves to be no longer diazotizable. The 4-chloroacetylamino-2,4'-dichloro-5'-methyl-1,1'-diphenyl-ether-2'-sulphonic acid is precipitated from the weakly soda alkaline solution by means of a sodium chloride solution in the form of a light colored resin and dried in a vacuum.

$\tfrac{1}{10}$ molecule of this compound is dissolved in 100 parts of water, 12 parts of Na$_2$S.9H$_2$O ($\tfrac{1}{20}$ mol.) are added and the whole is warmed on the water-bath for 12 hours. Then the reaction mass is cooled down and the condensation product obtained by precipitation with a sodium chloride solution as a grey paste. It is dried in a vacuum.

*Example 6*

18 parts of 2-amino-4,4'-dichloro-1,1'-diphenyl-ether-2'-sulphonic acid (made according to the method indicated in Example 2), are dissolved in 100 parts of water, 30 parts by volume of soda lye of 10% strength and 16.5 parts of 2,4- or 3,4-dichlorobenzoylchloride are added to this solution and stirred during 5 hours at 20–25° C., then for 1 hour at 50–60° C., whereupon the reaction for free amino groups is negative. The weakly alkaline solution is cooled and a sodium chloride solution added, whereby the condensation product separates as a smooth resin. It is dried in a vacuum giving, after grinding, a light colored powder, very soluble in water.

With 4-amino-4'-amyl-2'-chloro-1,1'-diphenylether-2-sulphonic acid, a similar compound is obtained.

It has in salt form the following formula:

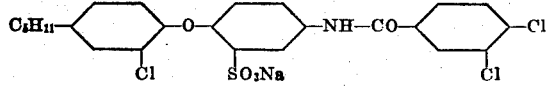

*Example 7*

The acyl compound used as starting material is prepared by the reaction of palm-kernal fatty acid chloride with 3'-methyl-4-amino-1,1'-diphenylether-2-sulphonic acid, made by condensation of m-cresol and 4-nitro-1-chlorobenzene-2-sulphonic acid and subsequent reduction, in pyridine. The raw product is freed from unchanged sulphonic acid by dissolution in alcohol and extraction, if necessary, of the palm-kernel fatty acid with petroleum ether. The purified product contains no free amino-group.

23 parts of the above condensation product are dissolved with the calculated amount of sodium carbonate in 100 parts by volume of water and chlorine introduced at 40–45° C., maintaining the reaction mass always weakly alkaline by dropping in soda lye. After 2 hours the halogenated compound is precipitated with hydrochloric acid, dissolved in ether, the ethereal solution is washed and dried. After distillation off of the ether a pasty residue is obtained, containing 10.8% of bound chlorine. The new compound in the form of the sodium salt is easily soluble in water forming foaming solutions.

Example 8

23 parts of the acylated product (prepared according to Example 7) are dissolved in 200 parts by volume of chloroform and saturated with chlorine at 40° C. After standing for 2 hours, the solution is washed with water and dried over calcium chloride. After distilling off the solvent, a paste is obtained with a 15% chlorine content. The sodium salt forms strongly foaming solutions. The chlorine may wholly or partly be replaced by bromine.

Instead of the above mentioned aminoarylsulphonic acid derivatives there may be used also the numerous other compounds listed in the description and the Examples 1–8 and also their basic compounds containing fewer halogen atoms or no halogen at all.

The improved products can f. i. be used for the treatment of textiles to render them mothproof. Such treatment can be carried out as follows:

(a) Wool or wool containing fabrics are treated at boiling temperature for 45 minutes to 1 hour with a solution of 0.3 to 0.6% of one of the compounds according to Examples 1 to 8 (calculated on wool), 3 to 5% of sulphuric acid and 10% of crystalline Glauber's salt, then the goods are rinsed and dried, or (b) Wool is treated at 60° C. for 45 minutes with a solution of 0.3 to 0.6% of the above mentioned compounds and 10 to 20% of crystalline Glauber's salt, then it is rinsed and dried.

What we claim is:

1. A process for the manufacture of halogen-substituted aminoarylsulphonic acids, comprising substituting at least one H-atom in the NH$_2$-group of amino-compounds of the general formula:

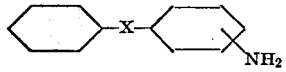

containing only one primary amino group and wherein X represents a member of the group consisting of —O—, —S—, —NH—, —SO—, —SO$_2$—, —CH$_2$—, —CO—, —NH—CO—NH—, by a radical of one member of the group consisting of aromatic, araliphatic, and high molecular aliphatic monoacylating agents and polyacylating agents, whereby at least one of the reactants must contain at least one halogen atom and one sulphonic acid group.

2. A process for the manufacture of halogen-substituted aminoarylsulphonic acids, comprising substituting at least one H-atom in the NH$_2$-group of amino-compounds of the general formula:

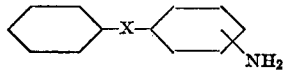

containing only one primary amino group and wherein X represents a member of the group consisting of —O—, —S—, —NH—, —SO—, —SO$_2$—, —CH$_2$—, —CO—, —NH—CO—NH—, by a radical of one member of the group consisting of aromatic, araliphatic and high molecular aliphatic monoacylating agents and polyacylating agents, whereby at least one of the reactants must contain at least one halogen atom and sulphonating the obtained water insoluble product.

3. A process for the manufacture of halogen-substituted aminoarylsulphonic acids, comprising substituting at least one H-atom in the NH$_2$-group of aminosulphonic acids of the general formula:

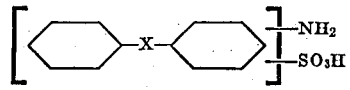

containing only one primary amino group and wherein X represents a member of the group consisting of —O—, —S—, —NH—, —SO—, —SO$_2$—, —CH$_2$—, —CO—, —NH—CO—NH—, by a radical of one member of the group consisting of aromatic, araliphatic, and high molecular aliphatic monoacylating agents and polyacylating agents, whereby at least one of the reactants must contain at least one halogen atom.

4. A process for the manufacture of halogen-substituted aminoarylsulphonic acids, comprising substituting at least one H-atom in the NH$_2$-group of halogenated aminosulphonic acids of the general formula:

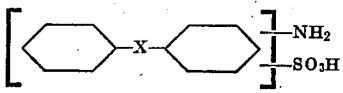

containing only one primary amino group and wherein X represents a member of the group consisting of —O—, —S—, —NH—, —SO—, —SO$_2$—, —CH$_2$—, —CO—, —NH—CO—NH—, by a radical of one member of the group consisting of aromatic, araliphatic, and high molecular aliphatic monoacylating agents and polyacylating agents.

5. A process for the manufacture of halogen-substituted aminoarylsulphonic acids, comprising substituting at least one H-atom in the NH$_2$-group of aminosulphonic acids of the general formula:

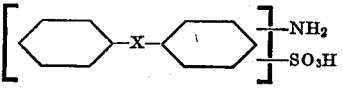

containing only one primary amino group and wherein X represents a member of the group consisting of —O—, —S—, —NH—, —SO—, —SO$_2$—, —CH$_2$—, —CO—, —NH—CO—NH—, by a radical of one member of the group consisting of aromatic, araliphatic, and high molecular aliphatic monoacylating agents and polyacylating agents, and halogenating the obtained product so that the final products contain at least one halogen atom.

6. A process for the manufacture of a halogen-substituted aminoarylsulphonic acid, comprising acylating 4-amino-4'-chloro-5'-methyl-1,1'-diphenylether-2-sulphonic acid with palm-kernel fatty acid chloride.

7. A process for the manufacture of a halogen-substituted aminoarylsulphonic acid, comprising acylating 4-amino-4'-amyl-2'-chloro-1,1'-diphenylether-2-sulphonic acid with a dichlorobenzoylchloride.

8. Halogensubstituted amino-arylsulphonic acids of the general formula:

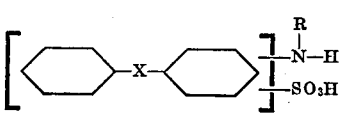

wherein X represents a member of the group consisting of —O—, —S—, —NH—, —SO—, —SO$_2$—, —CH$_2$—, —CO—, —NH—CO—NH—, and R represents a radical selected from the group consisting of aromatic, araliphatic, and high molecular aliphatic monoacyl radicals and of polyacyl radicals, said compounds containing at least one halogen atom and one sulphonic acid group and being valuable moth-proofing agents, disinfectants, fungicides, insecticides and bactericides.

9. The halogensubstituted amino-arylsulphonic acid of the formula:

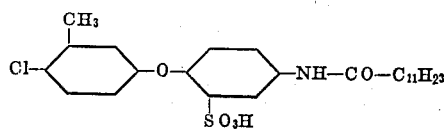

10. The halogensubstituted amino-arylsulphonic acid of the formula:

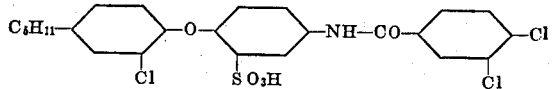

HENRY MARTIN.
HANS HEINRICH ZAESLIN.
RUDOLF HIRT.
ALFRED STAUB.